United States Patent Office 3,033,672
Patented May 8, 1962

3,033,672
WELDING MATERIAL AND METHOD OF WELDING
Melvin F. Rejdak, deceased, late of Cleveland, Ohio, by Hattie Wagner Rejdak, administratrix, Cleveland, Ohio, assignor to Erico Products, Inc., a corporation of Ohio
No Drawing. Filed Nov. 14, 1960, Ser. No. 69,215
20 Claims. (Cl. 75—27)

This invention relates as indicated to a novel welding material and method of welding, and more particularly to a metal-producing exothermic reaction mixture adapted to be utilized in the cast welding of copper rail bonds to steel rails and the like.

This application is a continuation-in-part of a prior copending application Serial No. 736,998, filed on May 22, 1958, now abandoned.

A superior copper producing exothermic reaction mixture is disclosed in Cadwell Patent No. 2,229,045, which has met with extensive commercial success in producing charges of molten copper suitable for cast welding the ends of copper rail bonds to steel rails, welding cathodic protection cables to steel pipelines, and the like. In order to produce a controllable reaction and to avoid hot cracking of the cast weld, however, it has in the past been thought necessary to produce the molten weld metal at a temperature substantially below that otherwise feasible. "Hot cracking" is grain boundary weakness at elevated temperatures, and it is a result of compounds, such as oxides or slag, being present in the grain boundaries. These cracks appear when stresses, formed for example by cooling the welding material from a liquid to a solid, are applied. Accordingly, special steps have previously been taken to control the reaction and produce the molten weld metal, ordinarily molten copper or a molten copper alloy, at comparatively reduced temperatures. In order to achieve a satisfactory bond or connection with a metal surface, and particularly a steel surface such as a steel rail head or steel pipe, it has been found necessary carefully to clean the portion of such surface with which the weld is to be made and especially to remove oxide scale therefrom. This involves a somewhat tedious scraping or grinding operation which is not very conveniently performed in the field and considerably increases the time and labor required in effecting a weld.

It is accordingly an important object of my invention to provide a novel metal-producing exothermic reaction mixture and method of welding which are adapted to produce molten weld metal at a relatively high temperature effective to penetrate oxide scale and the like on a metal surface with which a weld is to be made and to form a strong and electro-conductive connection therewith.

Another object is to provide such a mixture and method which will nevertheless also produce a cast weld substantially free of deleterious hot cracking.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

In accordance with the present invention, the exothermic reaction mixture comprises the oxide of the metal which is to form the bulk of the cast weld, notably copper, an active reducing agent effective to reduce such oxide to produce a molten metal charge, and a relatively small amount of a non-gas-generating vanadium compound having a boiling point in excess of 3500° F. The vanadium compound is likewise converted to molten vanadium metal, preferably by reduction by the same reducing agent where an oxide of vanadium or other reducible vanadium compound is used.

The vanadium metal thus formed is intimately mixed with the molten metal comprising the greater part of the charge and serves preferentially to combine with or scavenge the oxygen in the molten charge which would otherwise combine with or remain combined with the principal metal of the charge. A slight excess of the vanadium metal will preferably be thus produced so that when the molten metal solidifies, there will remain a small amount of vanadium as metal alloyed therewith.

Whereas the temperature of the molten metal produced by a standard prior art powder may be approximately 3500° F., the temperature of the molten metal as produced by this welding material may reach as high as 5500° F. The preferred working temperature range is about 4500° F. to about 5000° F.

The reducing agent may be a metallic reducing agent composed for example of aluminum, magnesium, or like metals. Aluminum is preferred. The exothermic reaction takes place almost instantly (within a fraction of a second) so that the evolution of gases is not only detrimental to the production of a good, sound weld but such evolution is also most hazardous to personnel. Accordingly, the vanadium compound employed must be non-gas-generating. For this reason certain salts of vanadium cannot be used. In general, only vanadium compounds having a boiling point in excess of 3500° F. can be employed. Specific vanadium compounds that have been found acceptable include vanadium metal itself, the oxides of vanadium, and vanadium alloys including vanadium-aluminum alloy and ferro-vanadium alloy. Of these vanadium compounds the oxides are preferred since they have high heats of formation and therefore release such high energy upon reduction. In this manner there is little or no heat loss when oxides of vanadium are used. The oxides are also quite effective in preventing or greatly reducing hot cracking of the cast weld metal. Of the oxides, vanadium pentoxide is preferred because of its high heat of formation. In fact, although vanadium forms several oxides, such as the trioxide and the tetraoxide, these tend to oxidize to the pentoxide so that the latter is used as the most convenient form.

A sufficient amount of the vanadium compound is employed to constitute about 0.8 percent to about 5 percent by weight of the exothermic reaction mixture calculated as vanadium pentoxide. It is preferred to employ a sufficient amount so that not all of the resulting vanadium metal in the molten charge will be oxidized due to its scavenging action.

A desirable but non-critical range of the ingredients which may comprise my welding material is approximately as follows by weight:

| | Percent |
|---|---|
| $Cu_2O$ | 70 to 77 |
| Aluminum | 9.5 to 12 |
| Vanadium compound (calculated as $V_2O_5$) | 0.8 to 5 |
| Copper | 7 to 8.2 |
| Flux | 4.5 to 5.5 |

A preferred welding formulation prepared in accordance with my invention is approximately as follows in weight percent:

| | Percent |
|---|---|
| $Cu_2O$ | 74.6 |
| Aluminum (325 mesh) | 10.3 |
| Vanadium compound (calculated as $V_2O_5$) | 2.1 |
| Copper (100 mesh) | 7.8 |
| $CaF_2$ | 3.1 |
| $CaSi_2$ | 2.1 |

The ingredients of the present mixture are usually used in a powdered state. For example, the aluminum may be ground to 325 mesh, U.S. Standard Sieve; the copper, to 100 mesh; and the vanadium compound, from 20 to 300 mesh. If desired, two or more of the ingredients of the exothermic reaction mixture may be alloyed together. It has already been noted that vanadium-aluminum alloy may be used which in reality furnishes some or all of the vanadium metal as the defined vanadium compound and some or all of the aluminum used as a reducing agent. The composition of the vanadium-aluminum may range from about 0.1 percent to about 50 percent by weight vanadium and the balance aluminum as long as the general composition distribution as described is followed. That is, either free vanadium or aluminum metal may in addition be needed depending upon the composition of the alloy. The vanadium-aluminum alloy has been found to furnish a more uniform, faster and hotter reaction than when such elements are used unalloyed.

Similarly, the ferro-vanadium alloy may vary from about 0.1 percent to about 50 percent by weight iron and the balance vanadium, keeping in mind the overall composition requirements. Usually where this alloy is used, the iron ranges from about 5 percent to about 10 percent by weight. The presence of iron is beneficial providing, for example, good hot strength and, where desired, the iron serves to modify somewhat the severity of the exothermic reaction.

In the same manner, the aluminum and copper ingredients can be alloyed together, for instance in a 50–50 weight ratio, and then comminuted for use in the reaction mixture. A further advantage in alloying together two or more ingredients of the exothermic reaction mixture lies in preventing physical segregation of such ingredients. Often, during shipment and the like, the reaction mixture is subjected to jarring and rattling which tend to segregate the ingredients according to the size and weight of the particles.

The advantage of premixing the vanadium compound with the reaction powder is that the reduced (molten) vanadium metal scavenges the oxygen, while the reaction is taking place, removing oxygen away from the copper in the molten charge to form a vanadium oxide again. The latter, however, is not nearly as damaging as copper oxide at the grain boundaries of the resultant weld. The weld obtained is not only physically strong but has excellent electrical properties. Since the reaction time and length of time that the alloy is in a liquid state are so short, it is preferable to use the oxide as the vanadium compound. The vanadium oxide is readily reduced at the same time the copper oxide is reduced to produce, in effect, vanadium metal in situ and thereby accomplish an intimate mixture with the welding material.

It will be appreciated by those skilled in the art that in the above formulations other fluxes such as cryolite and lithium fluoride, for example, may be utilized instead of the $CaF_2$ and $CaSi_2$. All of the ingredients are, as indicated, in powdered or finely granulated form, the copper as metal being included to control the exothermic reaction (by absorption of the heat necessary to melt the same) to an extent rendering such reaction controllable and non-explosive in character. The proportion of such copper as metal provided, however, is too small drastically to reduce the temperature of the molten metal charge produced, and such molten metal charge will be at a considerably higher temperature than has been the practice in the past. It has been found that such highly heated molten charge may be utilized to weld directly to the side of a steel rail head or to a steel pipe, for example, without the necessity of any elaborate prior cleaning operation unless the surface is unusually dirty or covered with an unusually thick layer of rust and scale. Even a small charge of the weld metal is capable of penetrating such surface oxide coating and forming an excellent weld with the underlying base metal without being prematurely chilled.

A typical starting powder formulation may be used to ignite the mixture in a manner known in the art, as disclosed for example in Patent No. 2,229,045. Such a formulation may have approximately the following composition in weight percent:

| | Percent |
|---|---|
| Cuprous oxide | 37.7 |
| Cupric oxide | 30.0 |
| Cu-Al alloy powder (equal proportions) | 20.0 |
| Aluminum powder | 4.7 |
| Red (amorphous) phosphorous | 7.6 |

Typical metals that can be welded in accordance with the present invention are steel, cast iron, copper, and bronze. Specific welding formulations that may be used in practicing the invention include the following, the percentages being by weight.

*Example I*

| | Percent |
|---|---|
| $Cu_2O$ | 75.4 |
| Aluminum (325 mesh) | 10.7 |
| $V_2O_5$ | 0.8 |
| Copper (100 mesh) | 7.9 |
| $CaF_2$ | 3.1 |
| $CaSi_2$ | 2.1 |

*Example II*

| | |
|---|---|
| $Cu_2O$ | 74.4 |
| Aluminum-copper alloy (equal parts by weight, 325 mesh) | 18.6 |
| $V_2O_5$ | 1.8 |
| $CaF_2$ | 3.1 |
| $CaSi_2$ | 2.1 |

*Example III*

| | |
|---|---|
| $Cu_2O$ | 73.4 |
| Aluminum (325 mesh) | 10.7 |
| Vanadium | 2.8 |
| Copper (100 mesh) | 7.9 |
| $CaF_2$ | 3.1 |
| $CaSi_2$ | 2.1 |

*Example IV*

| | |
|---|---|
| $Cu_2O$ | 72.4 |
| Vanadium-aluminum alloy (25% V, 325 mesh) | 15.0 |
| Copper (100 mesh) | 7.4 |
| $CaF_2$ | 3.1 |
| $CaSi_2$ | 2.1 |

*Example V*

| | |
|---|---|
| $Cu_2O$ | 71.4 |
| Aluminum (325 mesh) | 11.2 |
| Ferro-vanadium alloy (5% Fe, 100 mesh) | 4.8 |
| Copper (100 mesh) | 7.4 |
| $CaF_2$ | 3.1 |
| $CaSi_2$ | 2.1 |

*Example VI*

| | |
|---|---|
| $Cu_2O$ | 74.6 |
| Aluminum (325 mesh) | 10.3 |
| $V_2O_5$ | 2.1 |
| Copper (100 mesh) | 7.8 |
| Cryolite | 3.1 |
| $CaSi_2$ | 2.1 |

*Example VII*

| | |
|---|---|
| $Cu_2O$ | 74.6 |
| Aluminum (325 mesh) | 10.3 |
| $V_2O_5$ | 2.1 |
| Copper (100 mesh) | 7.8 |
| $CaSi_2$ | 2.1 |
| LiF | 3.1 |

Example VIII

| | |
|---|---|
| $Cu_2O$ | 74.6 |
| Aluminum (325 mesh) | 10.4 |
| $V_2O_5$ | 2.1 |
| Copper (100 mesh) | 7.8 |
| Cryolite | 3.1 |
| LiF | 2.1 |

It will now be apparent that the present invention provides a novel metal-producing exothermic reaction mixture and a method of welding which produces molten weld metal at relatively high temperatures. The molten weld metal penetrates oxide scale and the like on a surface with which a weld is to be effected. The cast weld is substantially free of deleterious hot cracking and has good electroconductive properties.

Other modes of applying the principle of the invention may be employed, change being made as regards the details described, provided the features stated in any of the following claims or the equivalent of such be employed.

It is therefore particularly pointed out and distinctly claimed as the invention:

1. An exothermic reaction mixture consisting essentially of copper oxide, a vanadium compound non-gas generating up to at least 3500° F. present in an amount from about 0.8 percent to about 5 percent by weight of the total mixture calculated as vanadium pentoxide, a sufficient amount of a reducing agent to reduce such copper oxide to molten copper and convert such vanadium compound to molten vanadium, and sufficient copper to render such reduction and conversion reactions non-explosive in character while providing a highly heated charge of molten metal.

2. An exothermic reaction mixture consisting essentially of copper oxide, from about 0.8 percent to about 5 percent by weight of the mixture, calculated as vanadium pentoxide, of a vanadium compound selected from the group consisting of vanadium, vanadium oxide, vanadium-aluminum alloy, and ferro-vanadium alloy, a sufficient amount of a metallic reducing agent to reduce such copper oxide to molten copper and convert such vanadium compound to molten vanadium, and sufficient copper in powdered form to render such reduction and conversion reactions non-explosive in character while producing a highly heated charge of molten metal.

3. The exothermic reaction mixture of claim 2 wherein said vanadium oxide is vanadium pentoxide, and said metallic reducing agent is aluminum also to reduce the vanadium pentoxide to molten vanadium.

4. The exothermic reaction mixture of claim 2 wherein said vanadium-aluminum alloy consists essentially of up to 40 percent by weight of vanadium and the balance aluminum, said aluminum also serving as a reducing agent.

5. The exothermic reaction mixture of claim 2 wherein said ferro-vanadium alloy consists essentially of up to 50 percent by weight of iron and the balance vanadium.

6. An exothermic reaction mixture consisting essentially of copper oxide, from about 0.8 percent to about 5 percent of vanadium oxide by weight of the total mixture, sufficient powdered aluminum to reduce both such copper oxide and such vanadium oxide to molten copper and vanadium, and sufficient powdered copper in the exothermic reaction mixture to render such reaction non-explosive in character while nevertheless producing a very highly heated charge of molten metal.

7. An exothermic reaction mixture comprising:

| | Percent by weight |
|---|---|
| $Cu_2O$ | 74.6 |
| Aluminum (325 mesh) | 10.3 |
| $V_2O_5$ | 2.1 |
| Copper (100 mesh) | 7.8 |
| $CaF_2$ | 3.1 |
| $CaSi_2$ | 2.1 |

8. An exothermic reaction mixture consisting essentially of about:

| | Percent by weight |
|---|---|
| $Cu_2O$ | 70 to 77 |
| Aluminum | 9.5 to 12 |
| $V_2O_5$ | 0.8 to 5 |
| Copper | 7 to 8.2 |
| Flux | 4.5 to 5.5 |

9. The exothermic reaction mixture of claim 8 wherein said flux is selected from the group consisting of calcium fluoride, $CaSi_2$, cryolite, and lithium fluoride.

10. An exothermic reaction mixture consisting essentially of copper oxide, from about 0.8 percent to about 5 percent of vanadium pentoxide by weight of the total mixture, sufficient powdered aluminum to reduce both such copper oxide and such vanadium pentoxide to molten copper and vanadium, and sufficient powdered copper in the exothermic reaction mixture to render such reaction non-explosive in character while nevertheless producing a very highly heated charge of molten metal.

11. An exothermic reaction mixture consisting essentially of copper oxide, from about 0.8 percent to about 5 percent of vanadium pentoxide by weight of the total mixture, sufficient powdered aluminum to reduce both such copper oxide and such vanadium pentoxide to molten copper and vanadium, and sufficient powdered copper in the exothermic reaction mixture to render such reaction non-explosive in character while nevertheless producing a very highly heated charge of molten metal having a temperature within the range of about 4500° F. to about 5500° F.

12. The method of producing a cast weld free of hot cracking which comprises reducing by a reducing agent in an exothermic reaction copper oxide and converting a vanadium compound non-gas generating up to at least 3500° F. to the molten state to produce a highly heated molten copper metal having a small amount of molten vanadium metal intermixed therewith, and then effecting a weld with such molten metal and cooling the weld to solidify the same without substantial hot cracking, such vanadium compound being present in a sufficient amount to combine after conversion to the molten state with oxygen in the molten metal.

13. The method of producing a cast weld free of hot cracking which comprises reducing by a metallic reducing agent in an exothermic reaction copper oxide and converting a vanadium compound selected from the group consisting of vanadium, vanadium oxide, vanadium-aluminum alloy, and ferro-vanadium alloy to the molten metal state to produce a highly heated molten copper metal having a small amount of molten vanadium metal intermixed therewith, and then effecting a weld with such molten metal and cooling the weld to solidify the same without substantially hot cracking, such vanadium compound being present in a sufficient amount to combine after conversion to the molten state with oxygen in the molten metal.

14. The method of claim 13 wherein such vanadium oxide is vanadium pentoxide, and such metallic reducing agent is aluminum also to reduce such canadium pentoxide simultaneously with the reduction of the copper oxide.

15. A method of producing a cast weld free of hot cracking from a charge of relatively high temperature in excess of at least about 3500° F. which comprises forming an exothermic reaction mixture of copper oxide, from about 0.8 percent to about 5 percent of the mixture by weight of vanadium pentoxide as a scavenger, and a sufficient amount of a reducing agent to reduce both of such oxides; reacting such ingredients to produce a molten metal charge having such relatively high temperature and comprising the reduced vanadium and copper; effecting a weld with such molten charge; and then cooling the weld; such vanadium combining preferentially with oxygen in such molten charge to prevent its union with such welding metal.

16. A method of producing a cast weld free of hot cracking from a charge of relatively high temperature which comprises forming an exothermic reaction mixture of copper oxide, from about 0.8 percent to about 5 percent of the mixture by weight of vanadium pentoxide as a scavenger, and a sufficient amount of a metal effective to reduce both of such oxides; reacting such ingredients to produce a molten metal charge having a relatively high temperature effective to penetrate metal scale and comprising the reduced vanadium and copper; effecting a weld with such molten charge; and then cooling the weld; such vanadium combining preferentially with oxygen in such molten charge to prevent its union with such copper and reduce formation of copper oxide at the grain boundaries; such amount of vanadium pentoxide employed being in excess of that needed when reduced to combine with such oxygen to alloy reduced vanadium metal with such weld upon solidification thereof.

17. A method of producing a cast weld at elevated temperatures which is substantially free of hot cracking comprising forming an exothermic reaction mixture of copper oxide, from about 0.8 percent to about 5 percent of the mixture by weight of vanadium pentoxide as a scavenger, a sufficient amount of a metal powder effective to reduce both of such oxides, and less than about 5.5 percent of the mixture by weight of a flux; reacting such ingredients to produce a molten metal charge having a temperature within the range of about 4500° F. to about 5500° F. comprising the reduced vanadium and copper; effecting a weld with such molten charge; and then cooling the weld; such vanadium combining preferentially with oxygen in such molten charge to prevent the union of such oxygen with such copper.

18. A method of producing a cast copper weld to a metallic workpiece having scale without preliminarily removing the scale which comprises forming an exothermic reaction mixture of a copper oxide, from about 0.8 percent to about 5 percent of the mixture by weight of vanadium pentoxide, a sufficient amount of a reducing metal powder to reduce both of such oxides, such metal powder being selected from the class consisting of aluminum powder and a mixture of copper powder with aluminum powder, and less than about 5.5 percent of the mixture by weight of a flux; igniting such mixture to produce a molten metal charge of a relatively high temperature effective to penetrate such scale, such molten charge comprising the reduced vanadium and copper metals; penetrating such scale on such workpiece by the molten metal charge to effect a weld; and then cooling the weld; such vanadium combining preferentially with oxygen in such molten charge to prevent its union with the welding copper metal.

19. A method of producing a cast weld free of hot cracking from a charge of relatively high temperature in excess of at least about 3500° F. which comprises forming an exothermic reaction mixture of copper oxide, a sufficient amount of vanadium pentoxide to provide at least enough vanadium metal to react as a scavenger with the oxygen of such copper oxide, and a sufficient amount of a metal effective to reduce both of such oxides; reacting such ingredients to produce a molten metal charge having such relatively high temperature in excess of at least 3500° F. and comprising the reduced copper; effecting a weld with such molten charge; and then on cooling of the weld combining such vanadium preferentially with oxygen in such molten charge to prevent its union with such welding metal.

20. The method of producing a cast weld free of hot cracking which comprises reducing by a reducing agent in an exothermic reaction copper oxide and vanadium pentoxide to produce a highly heated molten copper metal having a small amount of molten vanadium metal intermixed therewith, and then effecting a weld with such molten metal and cooling the weld to solidify the same without substantial hot cracking, such vanadium pentoxide being present in a sufficient amount to combine after reduction of both oxides with oxygen in the molten charge.

References Cited in the file of this patent
UNITED STATES PATENTS

| | | |
|---|---|---|
| 2,229,045 | Cadwell | Jan. 21, 1941 |
| 2,282,175 | Emerson | May 5, 1942 |
| 2,337,314 | Deppler | Dec. 21, 1943 |
| 2,789,896 | Coffer | Apr. 23, 1957 |
| 2,836,486 | Brennan | May 27, 1958 |